United States Patent
Marco

(10) Patent No.: US 10,582,473 B2
(45) Date of Patent: Mar. 3, 2020

(54) NON-ANCHOR CARRIER UTILISATION

(71) Applicant: JRD COMMUNICATION INC., Shenzhen, Guangdong (CN)

(72) Inventor: Olivier Marco, Guangdong (CN)

(73) Assignee: JRD COMMUNICATION INC., Shenzhen, Guangdong (CN)

( * ) Notice: Subject to any disclaimer, the term of this patent is extended or adjusted under 35 U.S.C. 154(b) by 0 days.

(21) Appl. No.: 16/082,532

(22) PCT Filed: Aug. 2, 2017

(86) PCT No.: PCT/CN2017/095576
§ 371 (c)(1),
(2) Date: Sep. 5, 2018

(87) PCT Pub. No.: WO2018/028488
PCT Pub. Date: Feb. 15, 2018

(65) Prior Publication Data
US 2019/0342852 A1  Nov. 7, 2019

(30) Foreign Application Priority Data

Aug. 12, 2016 (GB) .................................. 1613880.2

(51) Int. Cl.
*H04W 68/02* (2009.01)
*H04W 8/08* (2009.01)
*H04W 72/02* (2009.01)
*H04W 72/04* (2009.01)
*H04W 74/08* (2009.01)

(52) U.S. Cl.
CPC ............. *H04W 68/02* (2013.01); *H04W 8/08* (2013.01); *H04W 72/02* (2013.01); *H04W 72/0453* (2013.01); *H04W 74/0833* (2013.01)

(58) Field of Classification Search
CPC ... H04W 68/02; H04W 72/0453; H04W 8/08; H04W 72/02; H04W 74/0833
See application file for complete search history.

(56) References Cited

U.S. PATENT DOCUMENTS

2015/0078329 A1 * 3/2015 Zhu ..................... H04L 5/0005
370/330
2017/0238292 A1 * 8/2017 Rico Alvarino ...... H04L 5/0048
370/329

(Continued)

FOREIGN PATENT DOCUMENTS

| CN | 103650373 A | 3/2014 |
| WO | 2018/031141 A1 | 2/2018 |

OTHER PUBLICATIONS

Alcatel-Lucent, "Paging for low cost MTC", 3GPP Draft; R3-151011_PAGINGMTC, 3rd Generation Partnership Project (3GPP), vol. RAN WG3, No. Fukuoka, Japan; 20150525-20150529, May 24, 2015.

(Continued)

*Primary Examiner* — Hashim S Bhatti
(74) *Attorney, Agent, or Firm* — Baker & Hostetler LLP

(57) ABSTRACT

Methods are provided for assisting a UE to select a carrier for paging monitoring or for use in a random access request from a set of carriers comprise an anchor carrier and at least one non-anchor carrier. In one example, a carrier is selected based on a probability value associated with at least one of the carriers of the set.

1 Claim, 3 Drawing Sheets

(56) References Cited

U.S. PATENT DOCUMENTS

| | | | |
|---|---|---|---|
| 2019/0174457 A1* | 6/2019 | Liang | H04W 4/80 |
| 2019/0208503 A1* | 7/2019 | Li | H04W 72/005 |
| 2019/0239189 A1* | 8/2019 | Hwang | H04W 52/0216 |

OTHER PUBLICATIONS

Huawei, et al., "Paging optimization and MTC paging", 3GPP Draft; R2-153464 Paging Optimization, 3rd Generation Partnership Project (3GPP), vol. RAN WG2, No. Beijing, China; 20150824-20150828, Aug. 23, 2015.

ZTE, "New WI proposal on further enhancement of IoT in LTE", 3GPP Draft; RP-160917 New WI Proposal on Further Enhancement of Iot for LTE, 3rd Generation Partnership Project (3GPP), vol. TSG RAN, No. Busan, Korea; 20160613-20160616, Jun. 12, 2016.

Anonymous, "New work item proposal Enhancements of NB-IoT", 3GPP TSG RAN Meeting #72 RP-161324, pp. 1-8, Jun. 13, 2016.

Intel Corporation, "Remaining open aspects on NBIOT Paging", 3GPP Draft; R2-161258_NB-IOT_PAGING_INTELV01, 3rd Generation Partnership Project (3GPP), vol. RAN WG2, No. St Julian, Malta; 20160215-20160219, Feb. 14, 2016.

ZTE, "New WI proposal on further enhancement of cellular IoT for LTE", 3GPP TSG RAN Meeting #72, RP-161175, Jun. 16, 2016.

Ericsson, "Summary of email discussion on Multi-PRB configuration", 3GPP TSG-RAN WG2 #94, R2-164034, May 27, 2016.

Vodafone, et al., "Enhancements of NB-IoT", 3GPP TSG RAN Meeting #72, RP-161324, Jun. 16, 2016.

\* cited by examiner

Figure 1a
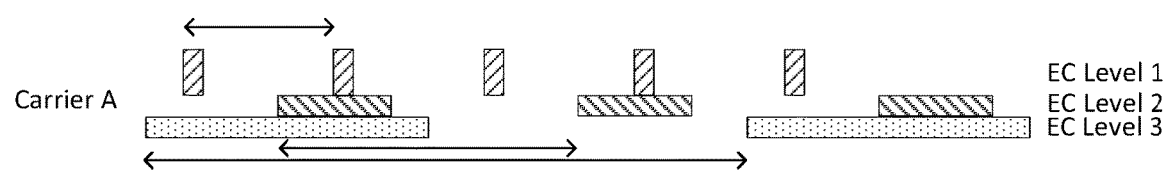
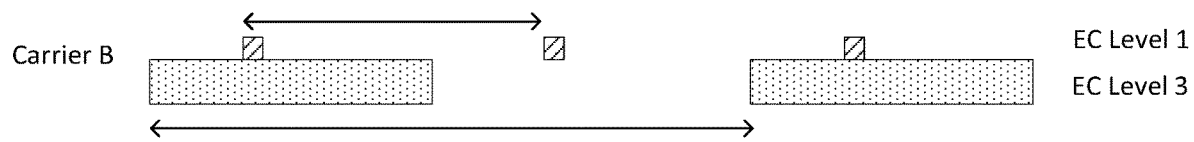
Figure 1b

NON-ANCHOR CARRIER UTILISATION

CROSS-REFERENCE TO RELATED APPLICATIONS

This application is a National Stage of International patent application PCT/CN2017/095576, filed on Aug. 2, 2017, which claims priority to foreign Great Britain patent application No. GB 1613880.2, filed on Aug. 12, 2016, the disclosures of which are incorporated by reference in their entirety.

TECHNICAL FIELD

This disclosure relates to methods and apparatus relating to the use of anchor and non-anchor carriers in NB-IoT systems, and in particular to the selection of carriers for the paging and random access procedures.

BACKGROUND

Autonomous devices communicating using cellular (or other) radio connections are commonly known as the "Internet of Things" (IoT). Typically IoT devices are autonomous and expected to function for extended periods of time without human intervention. It is expected that IoT devices will be used in high numbers, but with each device communicating infrequently and at relatively low data rates. This presents different challenges for system design compared to conventional radio systems having relatively smaller numbers of devices communicating more frequently and at higher data rates.

3GPP are proposing protocols for Narrow Band (NB) operation of IoT devices within the general structure of the cellular standards maintained by 3GPP. In particular, implementations within the LTE standards are being explored which maintain the higher-layers (RLC, MAC, RRC) of the LTE cellular standards, but which utilise different access and control procedures, as well as different physical channels and signals. These protocols are commonly referred to as NB-IoT.

In conventional cellular systems each UE "camps" on a particular carrier, corresponding to its serving cell, and that carrier is utilised for paging and random access requests. To increase capacity additional carriers can be added (as overlapping cells), and the UEs can be distributed across them with different load balancing techniques. While such techniques are also possible in NB-IoT systems, the synchronisation signals (NPSS, NSSS) and broadcast channels (NPBCH, SIBs) occupy approximately 30% of an NB-IoT carrier and duplication of these is wasteful.

A concept of "anchor" and "non-anchor" carriers has been introduced into Release 13 of the NB-IoT standards. An anchor carrier is one which carries all channels (including broadcast channels) as well as synchronisation signals, while a non-anchor carrier does not transmit the common signalling nor the synchronisation signals. A given cell hence has one anchor carrier, and may use one or more non-anchor carriers. A UE can be configured to utilise a non-anchor carrier after RRC Connection Establishment for unicast traffic, in order to relieve the anchor carrier from such traffic. In Release 13, paging and random access procedures are only supported on the anchor carrier.

In order to increase the overall capacity for paging and random access, it was proposed to utilise non-anchor carriers for those procedures, in addition to the anchor carrier. This introduces new challenges regarding load balancing over random access capable carriers and paging capable carriers within the same cell. Indeed, only a fraction of devices in the cell may support random access procedure or paging procedure over non-anchor carriers. Moreover, all carriers may not be equivalent from a performance point of view (e.g., power boost in downlink could be available on only one carrier). A solution is needed to distribute the UEs efficiently both for random access and paging procedures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention provides methods as set out in the accompanying claims.

BRIEF DESCRIPTION OF THE DRAWINGS

Embodiments of the invention will be described, by way of example, with reference to the following drawings, in which:

FIG. 1a and FIG. 1b shows random access resources on two carriers;

DETAILED DESCRIPTION

Figure 2:
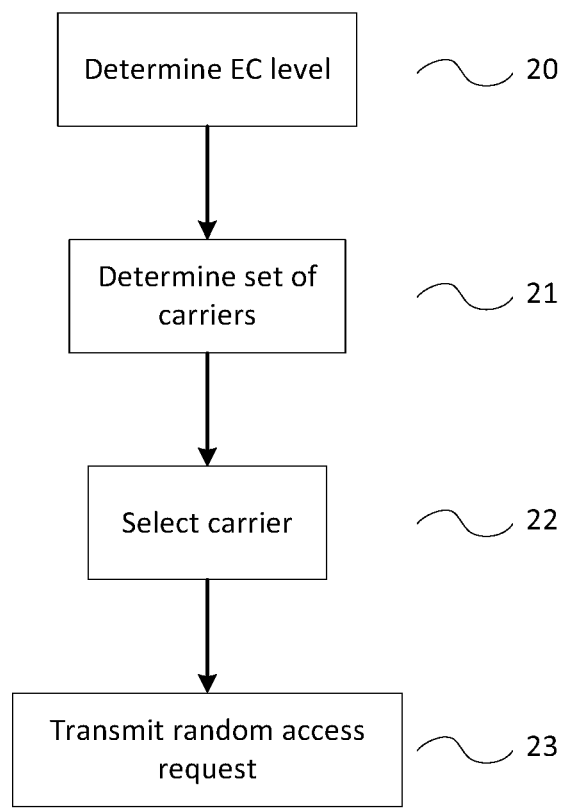
FIG. 2 shows a method of random access.

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Prior art systems utilising multiple carriers in NB-IoT systems utilise a single carrier for random access resources. In order to increase the available resources both anchor and non-anchor carriers should be available for the configuration of random access resources. The configuration of random access resources should also be possible based on Enhanced Coverage (EC) levels such that overall appropriate resources can be provided for each level. Load balancing should be provided between the carriers to attempt to optimise performance of the system. In order to ensure backwards compatibility, the load balancing system should also account for UEs which can only utilise the anchor carrier for random access requests.

In Release 13 of the NB-IoT standards up to 3 sets of random access resources can be configured on the anchor carrier, associated with up to 3 EC levels. Random access resource consists in NPRACH resources on the uplink, as well as associated random access common search space configuration in the downlink (CSS_RA). NPRACH resources are defined principally by a time pattern (periodicity/start time offset), a frequency pattern (number of subcarriers/start subcarrier offset), and number of PHY repetitions for each preamble transmission attempt (associated to the EC level addressed by the NPRACH resource). The CSS_RA is defined by a maximum number of NPDCCH repetitions $R_{max}$, as well as a periodicity and start offset. The extension of random access resources should retain this configuration ability, allowing each carrier to provide resources mapped to some or all EC levels. It is not expected to allow additional EC levels (more than 3), as the number of EC levels is linked to the device capacity to reliably discriminate between them, based on downlink measurements.

FIG. 1a shows a diagram of NPRACH (uplink) resource allocation on a first carrier (carrier A). FIG. 1a shows frequency of the Y axis and time on the X axis. NB-IoT utilises 48×3.75 kHz subcarriers within a 180 kHz bandwidth. For NPRACH resource allocation purpose, the subcarriers are grouped into groups of 12 subcarriers (i.e. the number of subcarriers is a multiple of 12; in the FIG. 1a, they are organized in 4 groups, but a different configuration exists if guard subcarriers are required). One NPRACH preamble occupies a bandwidth of one subcarrier. A predefined frequency hopping sequence is utilised, but is transparent for MAC layer and for the random access procedures discussed herein, hence it can be assumed that a a NPRACH preamble is identified in frequency by a given subcarrier (the subcarrier starting the frequency hopping sequence). Carrier A will be defined as the anchor carrier for the following discussion. Carrier A provides NPRACH resources for EC levels 1, 2 and 3.

FIG. 1b shows a comparable diagram to FIG. 1a, but for a carrier B which is defined as a non-anchor carrier for this discussion. Carrier B only provides NPRACH resources for EC levels 1 and 3.

For a given EC level, assuming the configured NPRACH resource consists in N subcarriers configured every T, one can define the resource rate R=N/T. In the following, $T_{ECLj}$ is the repetition period of the resources for EC level j (ECLj). $T_{ECL3}$ is the same for carriers A & B, but carrier B allocates 24 subcarriers (N=24) for EC level 3 and thus has twice the resource rate for $ECL_3$, i.e. $R_{ECL3, A}=\frac{1}{2} R_{ECL3, B}$. Also, $R_{ECL1, A}=4R_{ECL1, B}$ since carrier A has half the repetition period and twice the subcarriers of carrier B for $ECL_1$.

The collision rate for a given value of T and N, assuming the random access attempts follow a Poisson process with a transmission rate (load) of λ random access attempts per second is $P_{coll}=1-e^{-\lambda/R}$. For a small collision rate target this approximates to $P_{coll}=\lambda/R$. This is typically the case for random resource dimensioning, hence this will be assumed in the following.

For a given EC level j and corresponding total transmission rate (load) $\lambda_j$, the collision rate is minimized if the load is shared such as per carrier collision rate are equal (and minimal). This implies that the load of carrier A for $ECL_1$ should be 4 times the load of carrier B, and at $ECL_3$ the load of carrier B should be twice the load of carrier A.

This gives the following optimal probabilities for a UE to select a particular carrier:

| ECL, Carrier | Selection Probability |
| --- | --- |
| $P_{ECL1, A}$ | 0.8 |
| $P_{ECL1, B}$ | 0.2 |
| $P_{ECL2, A}$ | 1 |
| $P_{ECL2, B}$ | 0 |
| $P_{ECL3, A}$ | 0.33 |
| $P_{ECL3, B}$ | 0.67 |

When transmitting a NPRACH preamble, for a particular EC level, each UE may select a carrier according to these probabilities (with values derived according the particular distribution of resources over the available carriers), intended to give a similar collision rate for each carrier. Typically, for a particular EC level j, the UE can select a carrier i with a probability P, proportional to the resource density on that carrier: $P_i=R_i/R$, with $R=\Sigma R_i$ (from now on, the indexes of the coverage level ECLj are omitted for clarity).

A modified approach to the calculations shown above may be necessary in order to accommodate UEs which can only utilise the anchor carrier for NPRACH transmission. For example, UE's compliant with Release 13 of the NB-IoT standards, but not with later releases in which the procedures herein are implemented, can only select the anchor carrier for random access procedure. For a given EC level, such devices will generate a load $\lambda_{leg}$ on the anchor carrier. Considering Rel-14 UEs (supporting NPRACH on non-anchor carrier) generate a total load λ, distributed over the anchor ($\lambda_0$) and M non-anchor carriers ($\lambda_1 \ldots \lambda_M$), the optimal load distribution is achieved when the collision probabilities $P_{coll}$ on each carrier are equal, i.e. when $(\lambda_0+\lambda_{leg})/R_0=\lambda_1/R_1= \ldots =\lambda_M/R_M$ where carrier 0 is the anchor carrier, and there are M non-anchor carriers 1 ... M. The optimal carrier selection probabilities are then such as $(P_0+\lambda_{leg}/\lambda)/R_0=P_1/R_1= \ldots =P_M/R_M$.

For a given EC level, to calculate $P_i$ for each non-anchor carrier, a UE needs only to know $P_0$ and can then derive the probability with which to select any non-anchor carriers as $P_i=(1-P_0)*R_i/R_{NA}$, with $R_i$ being the resource density on each non-anchor carrier (given as $R_i=N_i/T_i$, with $N_i$ being the amount of resources and $T_i$ the periodicity of resources on carrier i, and $R_{NA}=\Sigma R_i$ being the total resource density on non-anchor carriers only).

For a given EC level, a full set of $P_i$ can also be communicated to the UEs. The eNB has access to the parameters required to calculate Pi and can thus calculate and transmit all required information to the UEs in order to select a carrier from a set of an anchor carrier and non-anchor carriers according to probabilities to achieve a similar collision rate across each carrier.

A number of possibilities are available to allow UEs to derive Pi in order to select a carrier.

The $P_i$ for each EC level may be signalled over each respective non-anchor carrier, with the probability for the anchor carrier being the complement. The signalling overhead required scales linearly with the number of non-anchor carriers.

$P_i$ for each EC level may be derived from the resource densities for this EC level: $P_i=R_i/R$, with $R=\Sigma R_i$ being the total resource density on all carriers. No additional signalling is required, but in this approach it is not possible to adjust the probabilities to account for UEs which can only utilise the anchor carrier for NPRACH transmissions.

$P_0$ for each EC level may be signalled to UEs and $P_i$ is then determined from $P_0$ and the resource densities for this EC level: $P_i=(1-P_0)*R_i/R_{NA}$, with $R_{NA}=\Sigma R_i$ being the total resource density on non-anchor carriers. For this approach signalling does not scale with number of non-anchor carriers.

FIG. 2 shows a flow chart of a method for selecting a carrier for a random access request.

At step 20 a UE determines its EC level. At step 21 the UE determines the carriers which are providing resource at the determined EC level. This defines the set of carriers from which the UE can select. At step 22 the UE selects a carrier for the transmission of its random access request. This carrier may be selected according to the principles described above. For example, the UE may have received an indication of Pi for each carrier and EC level and utilises those in a pseudorandom selection of a carrier. Alternatively, the $P_i$ values may be determined from resource densities calculated by the UE, or $P_i$ may be derived from a received $P_0$ value. The result of step 22 is selection of a carrier according to a process which intends to achieve comparable collision rates on all carriers. At step 23 the UE transmits its random access request on the carrier selected at step 22.

Alternatively, the UEs may be distributed using a hash of a UE_ID (e.g. a specific set of bits from the IMSI) by associating each hash with a carrier. For example, 2 bits of an IMSI can be used to distribute 25% of UEs on one carrier and 75% of UEs on another carrier. Although this systematically assigns UEs to a particular carrier, uplink carriers are equivalent and accordingly problems discussed in relation to unequal downlink carriers do not apply. The downlink part of the access procedure (CSS_RA) could be configured to use a different carrier than the uplink part in case unequal downlink carriers is an issue.

A further alternative is for each UE to use the same carrier as the one configured for paging ("paging carrier"), where the paging carrier configuration follows one of the method described later. The eNB may configure the UE to use for random access the carrier on which it monitors paging. This avoids the need for any additional signalling. However, this restrains the flexibility to configure random access resources and paging resources independently. Given that paging resources are only used for specific use cases (e.g. network command traffic use case), it may happen that only additional random access resources are needed on a non-anchor carrier, hence it may be desirable to be able to configure both type of resources independently.

Alternatively, a UE could be configured by RRC dedicating signaling to use a given carrier for random access, superseding the default carrier selection (using one of the above methods, or assuming default carrier is the anchor carrier). This could be applicable for random accesses while in RRC_CONNECTED and/or RRC_IDLE states, however for RRC_IDLE this may be efficient only for stationary devices since the configuration would be lost as soon as the serving cell is lost (e.g. by cell reselection). As NB-IoT devices are mostly stationary, this method may be sufficient to achieve a correct load balancing.

The carrier used for random access may also be selected dependent on report type. NB-IoT uses two different report types: normal report, which does not have any latency requirement, and exceptional report, which shall be delivered within 10 s. For example, some carriers may have better overall performance and be preferred for exceptional reports, and the eNB may configure UEs to use it whenever they need to send an exceptional report. For instance, some carriers may have a downlink power boost applied which may lead to faster Msg2/Msg4 reception and hence faster overall transmission. Guard-band carriers have more resources available for NB-IoT hence better overall performance (assuming same downlink power) and faster overall transmission than their in-band carrier counterpart. On the other hand, the non-anchor carriers may also have less latency due to not carrying the common signalling overhead which the anchor carrier carries. Alternatively, the UE may consider the earliest NPRACH resource first in the carrier selection algorithm. This enables to reduce latency, providing the NPRACH resources corresponding to a given EC level are configured over different carriers with a time offset.

When transmitting random access resources configuration for a number of carriers, it may be more efficient to transmit values for one carrier (for example the anchor carrier), together with delta values for carriers with parameters which differ from the anchor carrier.

In addition to the selection of carriers for random access, it is also desirable to distribute paging resources across multiple carriers. Such carriers are denoted as "paging carriers" in the following. Naturally, to minimise power consumption, UEs should only be required to monitor one PCCH for paging messages. The UE should thus have knowledge of which PCCH (and hence paging carrier) to monitor (at a given time instant). Similarly, the eNB should have knowledge of which PCCH (and hence paging carrier) each UE is monitoring at a given time instant to avoid the need to broadcast paging messages on multiple carriers which is inefficient. This requires both new PCCH configuration mechanism, as well as paging carrier selection mechanism. Prior art systems have suggested distributing UEs on paging carriers according to the UE's identity. For example, a selected set of bits of a UE_ID (for instance from IMSI) can be utilised to assign a UE to a carrier. However, such a system restricts flexibility and can lead to the suboptimal treatment of some UEs purely depending on their assigned IMSI. For example, some carriers, typically the anchor carrier, may have a power boost compared the other carriers leading to better quality signals and performance. UEs assigned to that carrier due to their IMSI will systematically receive better performance than other UEs.

In NB-IoT the PCCH configuration includes a default DRX paging cycle, T, a total number nB of paging occasions (POs) per DRX paging cycle T, and a maximum number of NPDCCH repetitions $R_{max}$ that are supported in the cell (for the paging common search space). The PO indicates the starting subframe for the NPDCCH paging common search space. The number of repetitions used by the eNB for each paging attempt should be derived according to the expected coverage level of the paged UE. In conventional systems the eNB uses paging assistance information cached from the last RRC Connection in the MME UE context to know the expected coverage level of the paged UE. When monitoring its paging occasion, the UE is expected to choose a number of repetitions adapted to its coverage level situation (this is left to implementation). In case of coverage level change at the UE, there is no MO signaling towards the network to indicate it as this would introduce too much signaling overhead, and moreover it is expected to be infrequent as enhanced coverage levels are more expected for stationary devices. When paging, if the eNB assumes a higher coverage level, it will use more repetitions but the UE would still be able to decode the NPDCCH. In the opposite case, the UE may not decode the NPDCCH. However, there will be a new paging attempt using a higher coverage level assumption.

The performance of non-anchor carriers may vary to each other (and to the anchor carrier) and hence if paging is permitted on non-anchor carriers the number of repetitions required and/or the overall time needed to acquire these repetitions may be dependent on the carrier used for paging. For example, the anchor carrier may have a 6 dB power boost. Moreover, in case of in-band or guard-band deployments, such power boost is only possible for one NB-IoT carrier due to constraints on the out-of-band emissions. In this situation, simulation results have shown that up to 4 times more repetitions may be required on a non-anchor carrier to achieve the same coverage as on the anchor carrier. In a second example, the anchor carrier and non-anchor carrier differs as the anchor carrier may have up to 30% less available subframes (due to the overhead of common physical signals and channels as well as system information broadcast). In a third example, a guard-band carrier has more resources elements available for NB-IoT than an in-band carrier (around 30%, as REs corresponding to LTE PDCCH and RS cannot be used), and may also have more available subframes (as MBSFN subframes may be reserved for in-band carriers but not for guard-band carriers). This would also translate in differences of reception duration.

The potential need for different repetitions number, or different overall downlink reception duration on non-anchor carriers may require a change in the PO density (lower nB) on such carriers, in order to limit the PO blocking (which can occurs when a paging with a high number of repetitions overlaps the following POs) and adjust the false paging rate. As a result, for each paging carrier, at least nB as well as the maximum number of NPDCCH repetitions supported on the carrier should be signalled to UEs. In addition, having separate nB value configuration can help to adjust the paging resources to the paging load on a given carrier.

The signalling overhead to transmit this information may be reduced by transmitting the full data for the anchor carrier, and transmitting delta values to adjust the parameters for other carriers.

The configuration is preferably broadcast in an SIB so that the UE can select a non-anchor carrier upon cell reselection. Such a system ensures each UE receives the information regardless of RRC connection state. The Parameters could be transmitted in a dedicated signalling message, for example an RRC message while in the RRC_CONNECTED state. However, such parameters only remain valid while connected or while camped in the same cell, but must be dropped when cell reselection occurs as the new cell may have different carrier configurations. After cell reselection the UE would then have no carrier information until it transitions to RRC_CONNECTED state and can receive the information.

Since not all UEs may support paging on a non-anchor carrier, a mechanism is required to indicate to the eNB whether a particular UE (which needs to be paged) support paging on non-anchor carrier. Such information may be added to the UE-RadioPagingInfo-NB IE, which is communicated from the UE to the eNB, and from the eNB to the system's MME. For example a "non-anchor paging" IE can be added. Further details can also be specified, for example whether the UE supports both anchor and non-anchor paging, or only non-anchor paging. When the MME issues an S1 paging message to an eNB, the non-anchor paging information can be included, thus allowing the eNB to know the UE capability and select an appropriate carrier for the paging message.

As noted above, it is beneficial for the eNB and the UE to have a common understanding of which paging carrier is used. Indeed it is expected that the eNB can page a UE on the carrier on which it is actually monitoring paging, avoiding the need to page it on all possible paging carriers in the cell. To this aim, the UEs can be distributed over the paging carriers based on their identity, for example based on the value of specific bits of the IMSI, but any hash function can be utilised. In existing system, the UE_ID (LSBs of IMSI) is used to distribute UEs over the paging resources (paging frames, paging subframes, and in the case of Category M1 UEs, paging narrowbands). This can be extended to distribute the UEs over the paging carriers. Assuming up to $2^M$ paging carriers can be configured, up to M bits can be used to select one of the possible $2^M$ carriers. Denoting $UE\_ID_{paging}$ (on M bits) the part of UE identity (e.g. IMSI, S-TMSI, or hash value of such UE identities) used for paging carrier determination, the paging carrier can simply be determined using CarrierIndex=$UE\_ID_{paging}$ mod NbPagingCarrier. The CarrierIndex mapping to paging carriers is either explicit (indicated in PCCH configuration) or implicit (e.g. 0=anchor carrier, 1=$1^{st}$ non-anchor paging carrier, . . . ).

As discussed above in relation to random access, not all UEs will support paging on non-anchor carriers. Those UEs must therefore utilise the anchor carrier for paging, which creates an additional paging load on the anchor carrier which cannot be offloaded to non-anchor paging carriers. The paging resources can be adapted to different paging load (e.g. using nB parameter). However one goal of having paging on non-anchor carriers is to efficiently distribute the paging load over different carriers. The algorithm used to assign UEs to paging carriers should account for this as it can affect the distribution and hence load balancing.

For example, a particular cell may have two paging carriers: one anchor carrier and one non-anchor carrier. In the legacy approach, the paging carrier can simply be determined using CarrierIndex=$UE\_ID_{paging}$ mod NbPagingCarrier, with NbPagingCarrier=2. This means that only 1 bit of $UE\_ID_{paging}$ is used to distribute UEs over the two paging carriers.

If all UEs in the cell support non-anchor paging then they should be distributed equally between the two carriers. However, if half of those UEs do not support non-anchor paging, then this arrangement results in 75% of UEs using the anchor carrier (all UEs which do not support non-anchor carrier paging, plus 50% of those that do) and 25% using the non-anchor carrier. In this particular example the unequal distribution can be addressed by assigning all UEs which can use non-anchor carriers to use the non-anchor carrier, but this does not provide a generally applicable solution.

If ⅓ of all UEs can only use the anchor carrier for paging (for example, from 15,000 UEs in a cell, 5,000 UEs can only use the anchor carrier, and 10,000 can use any carrier), an equal distribution cannot be achieved with one bit of the $UE\_ID_{paging}$. Utilising two bits does allow an equal distribution because this provides four values which can be used to group the UEs. One value (25% of the non-anchor supporting UEs) can be assigned to the anchor carrier, and three values to the non-anchor carrier. In this example, this results in 7,500 UEs on each carrier.

In the general sense, instead of using the legacy approach CarrierIndex=$UE\_ID_{paging}$ mod NbPagingCarrier, groups of $UE\_ID_{paging}$ values can be assigned to carriers. The granularity with which UEs can be mapped to paging carriers can be configured by selecting an appropriate number of bits G for the $UE\_ID_{paging}$ (for example, 3 bits gives a granularity of 12.5% of UEs), which may be higher than M (number of bits required to address the maximum number of paging carriers in the system). Each paging carrier can be associated with a list of $UE\_ID_{paging}$ corresponding to UEs which will be assigned to that carrier. This arrangement allows different proportions of UEs to be assigned to each paging carrier, thereby enabling to approach equal overall distribution when a portion of the UEs can only use the anchor carrier. In the above example, M=1 (2 carriers in the system), but we can use G=2 bits for $UE\_ID_{paging}$. Three $UE\_ID_{paging}$ values are in one group assigned to the non-anchor carrier, one $UE\_ID_{paging}$ value in a second group is assigned to the anchor carrier. This can be configured with a threshold between groups defined by the $UE\_ID_{paging}$ value. For example, here the threshold value is 3 (11 in binary) with UEs having $UE\_ID_{paging}$ values below to the threshold being in the first group and UEs above or equal to the threshold being the second group. In general, for N carriers N−1 thresholds are required to distribute UEs across all carriers. The number of bits in the threshold then defines the granularity with which that can be achieved. For example a three-bit threshold can distribute UEs with a 12.5% granularity. A greater number of bits improves the accuracy with which equal loading can be achieved, but increases signalling load. As a particular case, this method can also be used to exclude all UEs from a given carrier (for instance from the anchor carrier, for use cases where it is already overloaded by Rel13 UEs). This method may also be combined with the legacy approach: one threshold only can be used to distribute UEs between 2 groups with the desired proportion (for example, one group for the anchor carrier, and one group for the non-anchor paging carriers), whereas the legacy approach may be used to distribute UEs to the carriers within each group (in this example, UEs assigned to non-anchor carriers would be distributed with the legacy approach). This can be generalized to more than 2 groups. Alternatively, instead of using thresholds to define the mapping to paging carriers, the list of $UE\_ID_{paging}$ corresponding to each paging carrier may be signalled. The signalling can be optimized to signal efficiently a long range of consecutive $UE\_ID_{paging}$, by using bit masks or indicating the start/number of consecutive $UE\_ID_{paging}$.

A further option is that signalling may indicate whether UEs capable of using non-anchor carriers should only be paged on non-anchor carriers, or whether they can be paged on both anchor and non-anchor carriers. That means, the paging carriers set (set of carriers supporting paging) considered by UEs capable of using non-anchor carriers can be configured to contain either only non-anchor carriers, or anchor and non-anchor carriers. The paging carrier assignment can then follow the legacy method, using the configured paging carriers set. This limits the signalling impact, at the expense of less flexibility.

As well as load balancing, carrier selection may also be used to preferentially select some paging carriers, for example those with better performance. As noted above, the distribution of UEs across carriers based only on their identity can lead to systematically assigning certain UEs to poorly performing carriers. This drawback can be addressed by also selecting the paging carrier as a function of time. For example, the System Frame Number (SFN) or Hyper Frame Number (HFN) may be utilised to cycle each UE through the available carriers. Such a system may encounter difficulties with UEs with a max DRX cycle (2.91 hours) as they will also see the same HFN/SFN for their Paging Opportunity. To handle such DRX cycles, additional HFN bits would be required. Moreover, cycling carriers based on time prevents assigning UEs to carriers based on their coverage level, as described below.

Generally, it may be desirable to assign a UE in deep coverage to the best carrier. A carrier with 6 dB power boost may need up to 4 times less repetitions—i.e. up to 4 times less consumption for each PO monitoring. A non-anchor carrier may have ~40% more subframes available than an anchor carrier, hence ~40% less reception time needed (assuming same downlink power). Similarly a guard-band carrier would have more resources available for NB-IoT than an in-band carrier, other parameters being equal, reducing the reception time. This would also reduce the UE power consumption for each PO monitoring. Conventionally, a UE does not indicate any coverage level change to the network while in RRC_IDLE state. During the RRC Connection Release procedure, the eNB may provide the latest coverage level of the UE to the MME. The MME may convey that information to the eNB when sending an S1 paging request and the information may be used in the paging process. Live signalling of the coverage level is not desired due to the added signalling load and power consumption requirements. It is therefore not possible to directly select a paging carrier based on definitive knowledge of a UE's current coverage level.

RRC level dedicated (UE-specific) configuration of a paging carrier may not be reliable as it is only applicable to the cell where this configuration is performed. A UE initially configured with a non-anchor paging carrier may reselect a different cell (with a different configuration), dropping the RRC configuration, before returning to the current cell, and eventually select the anchor carrier instead of the initially configured non-anchor carrier. Hence, the UE is therefore no longer using the expected paging carrier previously configured. The paging carrier related information described below could be configured at RRC level only, however, this would require possible paging reattempts (after initial paging attempt failure on the anchor carrier), to account for cases where UE has lost the paging carrier configuration.

Instead, NAS level dedicated (UE-specific) configuration could be used (similarly, for instance, as the eDRX paging configuration). The eNB can derive paging carrier related information (used to derive the paging carrier to select), while the UE is in RRC_CONNECTED state, typically at RRC Connection Release. Such information can be sent to the MME (e.g. in UE context release complete/UE context suspend request S1-AP messages) and to the UE in dedicated RRC signaling (e.g. in RRC Connection Release). The UE selects the paging carrier according to the paging carrier related information. During paging, the MME includes the paging carrier related information in the S1 message to the eNB, which enables the eNB to select the correct paging carrier. The paging carrier related information would be stored at NAS level within the UE and the MME.

In one option, the paging carrier related information may include the paging carrier set, e.g. whether UE/eNB should consider only the anchor carrier for paging, other non-anchor carriers as well, or only non-anchor carriers. The choice of a specific carrier among paging carriers in the set can still be based on the UE's ID, as discussed above. It can be beneficial for the eNB to select the anchor carrier for UEs in bad coverage. Moreover, this also enables the eNB to activate the non-anchor paging feature on a per UE basis, as by default (or when not specifically configured) the paging carrier related information can indicate to select only the anchor carrier, leading to the same behaviour as in Rel-13.

In a further option, the paging carrier related information includes a parameter "CarrierGroup". M bits can be utilised to distribute UEs over $2^M$ carriers. The choice of the paging carrier can be done according to CarrierIndex=CarrierGroup mod NbPagingCarrier. In legacy approach, such formula would be used with CarrierGroup being M bits of a UE_ID (e.g. the IMSI). Instead, CarrierGroup can be decided by the eNB depending of the paging load and the coverage condition of the UE, and included in the paging carrier related information. The paging carrier set may still be configured separately, i.e., it may include all paging carriers or only non-anchor paging carriers.

In a further option, the paging carrier related information includes the "CarrierIndex", with fallback explicit or implicit rules in case it points to a non-existing paging carrier (since all cells may not be configured with the same number of paging carriers). For instance, a fallback rule can be that if there is no paging carrier corresponding to the CarrierIndex in the cell, the anchor carrier is used. Both the eNB and the UE would apply the same rule, hence there is no ambiguity on which paging carrier is used. The CarrierIndex mapping to paging carriers is either explicit (indicated in PCCH configuration) or implicit (e.g. 0=anchor carrier, 1=1$^{st}$ non-anchor paging carrier, . . . ). With this method, it is possible to assign any UE to a specific paging carrier, defined by its CarrierIndex. It can be beneficial for instance for the eNB to indicate a specific carrier with better performance (e.g. a guard-band non-anchor carrier) for UEs in bad coverage.

In a further option, the paging carrier related information includes the coverage enhancement level already signaled over S1. In such case it does not need to be signaled over S1 (but still over RRC). The paging carriers may be mapped to different coverage enhancement levels, and the mapping signaled in SIB. Alternatively, the eNB may derive internally the paging carrier and send the paging CarrierIndex in the dedicated RRC signaling to the UE.

Figure 3:
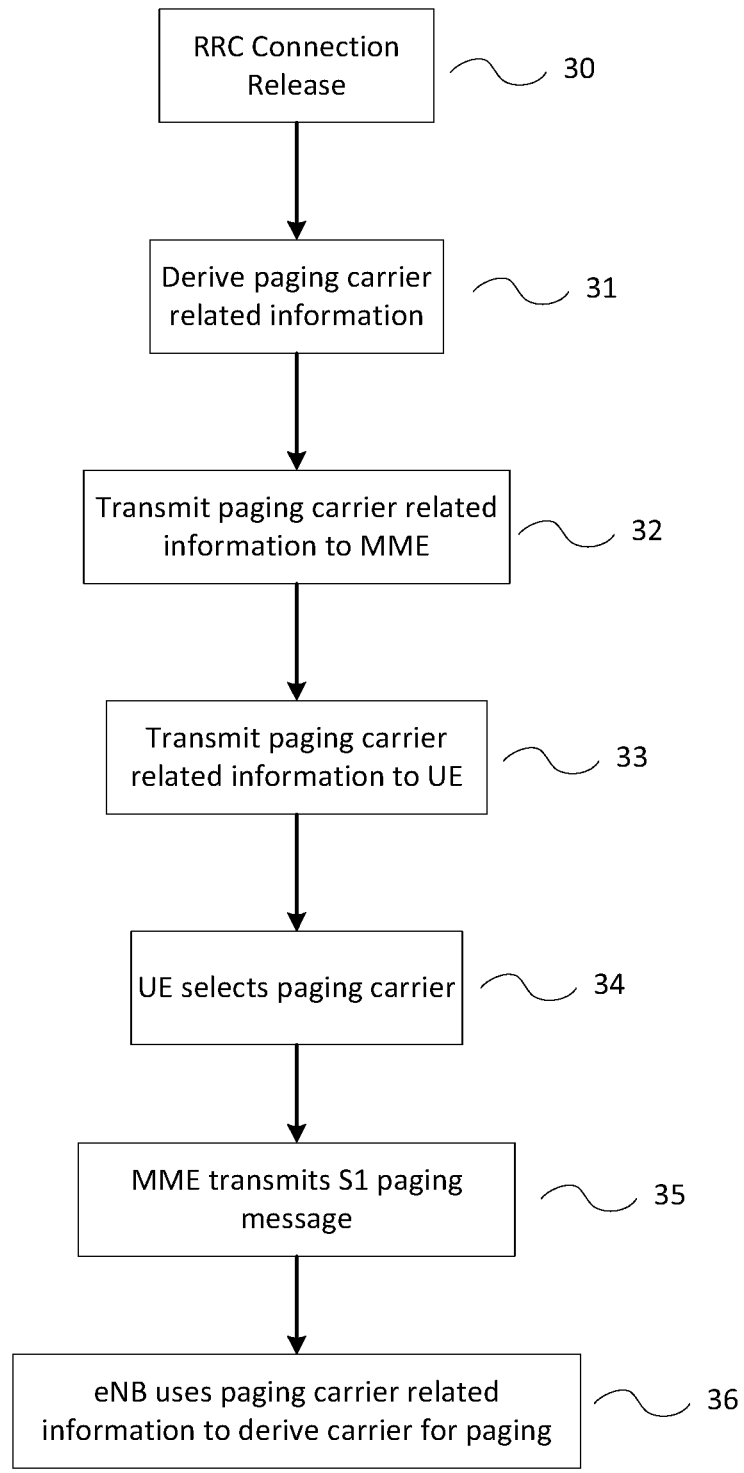
FIG. 3 shows a method of paging.

FIG. 3 shows a flow chart of a method of selecting a paging carrier.

At step 30 an RRC Connection Release event occurs, and at step 31 the eNB derives the paging carrier related information.

At step 32 the paging carrier related information is sent to the MME, for example in a UE context release complete message or UE context suspend request message. At step 33 the paging carrier related information is sent to the UE in dedicated RRC signalling, for example in an RRC Connection Release message. However, if the paging carrier related information is the coverage enhancement level which has already been signalled over S1, it does not need to be sent again in step 32.

At step 34 the UE selects a paging carrier according to the paging carrier related information.

At step 35 the MME transmits an S1 paging request message to an eNB, including the paging carrier related information. At step 36 the eNB uses the paging carrier related information to derive the carrier on which to page the UE.

The paging carrier related information used in the method of FIG. 3 may include:
The paging carrier set, including whether
  the UE shall only use the anchor carrier;
  the UE shall only use non-anchor carriers;
  the UE may use any carrier;
A "CarrierGroup" index. The UE and eNB may derive the CarrierIndex from CarrierGroup and the number of paging carriers in the cell. For example, CarrierIndex=CarrierGroup mod NbPagingCarrier. The paging carriers set can be all carriers in the cell, or only non-anchor carriers. The CarrierIndex points to paging carrier defined in the cell by implicit or explicit association (in PCCH configuration)
A CarrierIndex; with explicit or implicit fallback rules in case it points to a non-existing paging carrier. For instance, CarrierIndex 0 may mean the anchor carrier, CarrierIndex 1 the first configured paging carrier (in SIB)—if not configured, default could be to use the anchor carrier.
Coverage enhancement level. For example, a UE in extreme coverage may be assigned to the anchor carrier. Carriers may be mapped to different coverage enhancement levels, which mapping may be communicated in SIB messaging
A combination of options, for example:
  a combination of coverage enhancement level and assigning UEs based on identity (e.g., above a given coverage enhancement level, use a specific carrier (e.g., anchor carrier); below, distribute UEs based on identity)
  a combination of using paging carrier set with UE_IDs for most UEs, but using CarrierIndex dedicated configuration for selected UEs (e.g. UEs in bad coverage).

As indicated above, the PCCH configuration for multiple carriers is expected to be broadcast in System Information (SI). Whenever new paging carriers will be deployed or removed, this configuration will need to be updated, and this may affect the reachability of the UEs (e.g. if as a result, some UEs need to select a different paging carrier).

When a change is made to System Information (SI) which affects paging, UEs must be notified in such a way that it is certain all UEs receive the information to update their PCCH configuration such that they can monitor the correct PO windows. This can be particularly challenging when eDRX is activated. In existing system, the UEs can be notified of a forthcoming SI change at next eDRX HFN boundary (approximately 3 hours boundary) through SI update notification in paging message (PDCCH or PDSCH). Hence to reach all UEs, SI update notifications needs to be sent in all POs (with the number of repetitions corresponding to maximum EC level), during the maximum length of an eDRX cycle (approximately 3 hours). Upon receiving a notification of a change the UE reads the SI on the next eDRX HFN boundary. Such a process may be impractical or even impossible in practice due to the resources required. For example, 512 repetitions (512 ms) may be required every second (assuming PO periodicity of 1 s; it can be down to a few ms, up to 10.24 s) during the 3 hours window.

In order to improve the functionality of SI changes relating to paging, a pre-warning/notification may be transmitted on an SIB which indicates a forthcoming change in SI, together with the time boundary at which the change will occur. This can enable to leverage the existing SI validity check due to SI validity timer (which is currently defined with a value of 24 hours for NB-IoT). For instance, a pre-warning/notification may be transmitted in SIB during 24 h previously to the SI update, additional HFN bits can be sent, e.g. 3 bits to reach a 24 h time period (this may be conditional to the notification, or not conditional if other benefits is seen with these bits), and the SI update occurs at 24 h time boundary. Longer periods may be used to increase the probability that all UEs have received the indication. The indication in the SIB is acquired in the normal SI update procedure (UEs check the SI validity at least once every validity period, for example 24 hours) and on the SI change boundary read the updated SIB.

Although such a process limits the SI update frequency, for example to 24 hours, this is not a significant impact as SI changes affecting paging are rare and can be aligned to such 24 h or 48 h boundaries. However, the system brings the advantage that there is no need for the large number of resources required (transmission at maximum repetition on all POs) in the previously proposed system.

Those skilled in the art will appreciate that methods according to the embodiments may be carried out by software computer programs, hardware, or a combination of software and hardware.

These methods are provided by way of example only. The disclosure of this application is not restricted by the specific combination of steps shown in the figures, and described herein, but includes any appropriate subsets or combinations of steps performed in any appropriate order. Sections of the method may be performed in parallel.

The term 'user equipment' (UE) is used herein to refer to any device with processing and telecommunication capability such that it can perform the methods according to the embodiments of the present invention. Those skilled in the art will realize that such processing and telecommunication capabilities can be incorporated into many different devices and therefore the term 'user equipment' includes mobile telephones, personal digital assistants, PCs and many other devices.

It will be appreciated that the methods described above apply to any other wireless technologies without losing the effect sought.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A method to support paging a UE capable of receiving paging messages on a set of carriers comprising an anchor carrier and at least one non-anchor carrier, the method comprising the steps of:
   at a UE, sending to an eNB an indication that the UE supports paging on non-anchor carriers using a UE-RadioPagingInfo-NB IE,
   at an eNB, receiving the UE-RadioPagingInfo-NB IE from the UE and sending the UE-RadioPagingInfo-NB IE to an MME,
   at an MME, when sending a message to an eNB to page the UE, including the UE-RadioPagingInfo-NB IE.

* * * * *